United States Patent
Brink et al.

(10) Patent No.: US 10,060,558 B2
(45) Date of Patent: Aug. 28, 2018

(54) WATER SUCTION HOSES

(71) Applicant: Emstec GmbH, Oststeinbek (DE)

(72) Inventors: Burghard Brink, Feusisberg (CH); Ian Craig, Hartlepool (GB)

(73) Assignee: Emstec GmbH, Oststeinbek (DE)

( * ) Notice: Subject to any disclaimer, the term of this patent is extended or adjusted under 35 U.S.C. 154(b) by 0 days.

(21) Appl. No.: 15/502,822

(22) PCT Filed: Nov. 24, 2015

(86) PCT No.: PCT/EP2015/077481
§ 371 (c)(1),
(2) Date: Feb. 9, 2017

(87) PCT Pub. No.: WO2016/083363
PCT Pub. Date: Jun. 2, 2016

(65) Prior Publication Data
US 2017/0284569 A1 Oct. 5, 2017

(30) Foreign Application Priority Data

Nov. 25, 2014 (GB) .................................. 1420913.4

(51) Int. Cl.
*F16L 7/00* (2006.01)
*E21B 43/08* (2006.01)
(Continued)

(52) U.S. Cl.
CPC .............. *F16L 7/00* (2013.01); *B01D 29/114* (2013.01); *B01D 29/54* (2013.01); *C02F 1/004* (2013.01);
(Continued)

(58) Field of Classification Search
CPC ... F16L 3/003; F16L 7/00; F16L 11/20; F16L 39/02; C02F 1/004; C02F 2103/08;
(Continued)

(56) References Cited

U.S. PATENT DOCUMENTS 4,151,864 A * 5/1979 Thurman ............... D06F 39/083
138/106
4,643,457 A 2/1987 Press
(Continued)

FOREIGN PATENT DOCUMENTS

| CN | 103221111 A | 7/2013 |
| CN | 203094432 U | 7/2013 |

(Continued)

OTHER PUBLICATIONS

Möbius, Henning, "International Search Report," prepared for PCT/EP2015/077481, dated Feb. 15, 2016, three pages.
(Continued)

*Primary Examiner* — David C Mellon
*Assistant Examiner* — Liam Royce
(74) *Attorney, Agent, or Firm* — Winstead PC

(57) ABSTRACT

A hose section (10) for a sea water suction hose (50) and a method of assembling a sea water suction hose (50) is provided. The hose section (10) comprising attachment means (18) for attaching an auxiliary hose section (20) thereto. The method of assembling the sea water suction hose (50) comprising the steps of providing at least two sea water hose sections (10) each having an attachment means (18) for attaching an auxiliary hose section (20) thereto, attaching an auxiliary hose section (20) to each sea water hose section (10), connecting the auxiliary hose sections (20) together and connecting the sea water hose sections (10) together.

13 Claims, 9 Drawing Sheets

(51) Int. Cl.
| | |
|---|---|
| *C02F 1/00* | (2006.01) |
| *B01D 29/11* | (2006.01) |
| *F16L 11/20* | (2006.01) |
| *F16L 39/02* | (2006.01) |
| *B01D 29/54* | (2006.01) |
| *B01D 35/28* | (2006.01) |
| *C02F 103/08* | (2006.01) |

(52) U.S. Cl.
CPC .............. *E21B 43/08* (2013.01); *F16L 11/20* (2013.01); *F16L 39/02* (2013.01); *B01D 35/28* (2013.01); *C02F 2103/08* (2013.01)

(58) Field of Classification Search
CPC ...... B01D 29/54; B01D 29/114; B01D 35/28; B63B 2035/448; E21B 19/004; E21B 43/08; F04B 53/20
See application file for complete search history.

(56) References Cited

U.S. PATENT DOCUMENTS

| | | | |
|---|---|---|---|
| 4,731,177 A | 3/1988 | Hemman | |
| 4,816,148 A | 3/1989 | Hemman | |
| 5,311,909 A * | 5/1994 | Adcock | A62C 33/04 137/899 |
| 9,429,250 B2 * | 8/2016 | Lewis | F16L 3/003 |
| 9,671,045 B1 * | 6/2017 | Huebl | F16L 3/1226 |
| 2005/0146139 A1 | 7/2005 | Huybrechts et al. | |
| 2007/0084514 A1 * | 4/2007 | Perratone | B63B 21/50 137/615 |
| 2010/0310319 A1 | 12/2010 | Pionetti | |
| 2012/0183357 A1 | 7/2012 | Randrianarivony et al. | |
| 2012/0285901 A1 * | 11/2012 | Holm | B01D 29/073 210/790 |
| 2014/0124430 A1 | 5/2014 | Herges et al. | |
| 2015/0159444 A1 | 6/2015 | Stankovic | |
| 2017/0234459 A1 | 8/2017 | Brink et al. | |

FOREIGN PATENT DOCUMENTS

| | | |
|---|---|---|
| EP | 0359392 A1 | 3/1990 |
| EP | 1122482 A2 | 8/2001 |
| EP | 2049389 A1 | 4/2009 |
| EP | 2303679 A1 | 4/2011 |
| GB | 834229 A | 5/1960 |
| KR | 20110061876 A | 6/2011 |
| WO | WO-03006783 A1 | 1/2003 |
| WO | WO-2008017937 A1 | 2/2008 |
| WO | WO-2010010500 A1 | 1/2010 |

OTHER PUBLICATIONS

Fromentel, Henri, "International Search Report," prepared for PCT/EP2015/077479, dated Feb. 8, 2016, five pages.

* cited by examiner

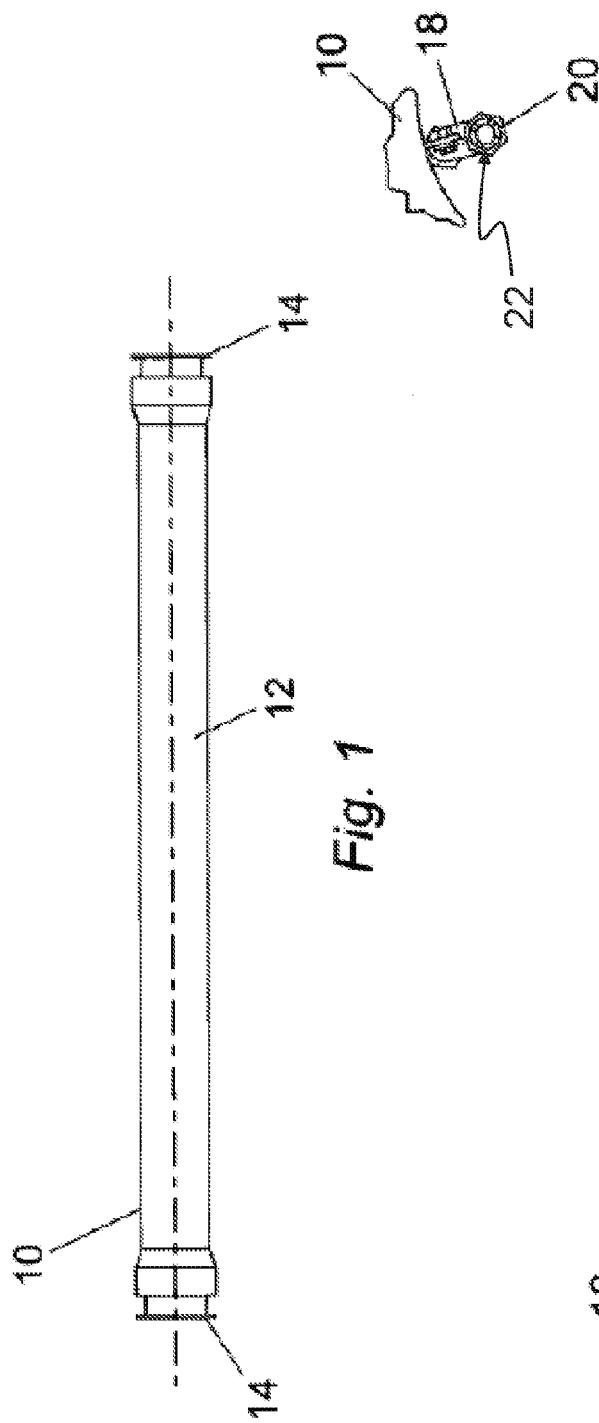

WATER SUCTION HOSES

The present invention relates to a hose section, particularly, but not exclusively, to a hose section for a seawater suction hose system and a method of assembling a seawater suction hose.

INTRODUCTION

Conventional seawater suction hose systems such as those installed on Floating Production Storage and Offloading (FPSO) vessels typically comprise a plurality of hoses and caissons. Each hose typically comprises of a plurality of hose sections interconnected to form a continuous hose. The continuous hose combines with a caisson on the FPSO to form the seawater suction system.

The free end of the hose is fitted with a suction strainer for straining seawater that is drawn into the hose. The suction strainer is fitted with a hypochlorite dispersion ring, which is used to disperse hypochlorite around the suction strainer as seawater is drawn through the hose. The dispersion of hypochlorite prevents marine growth in the suction hose system and associated pipework of the FPSO.

In order to supply hypochlorite to the dispersion ring it is necessary to provide a hypochlorite supply line within the hose. The hypochlorite supply line comprises a plurality of line sections.

In order to prevent the hypochlorite supply line from breaking, each line section is required to be secured within the hose. This is achieved by providing a plurality of hose adaptors between each hose section. Each hose adaptor provides an internal mount for securing each hypochlorite line section thereto. Installing a hose adaptor between each hose section is costly and increases the assembly time of the hose. Furthermore, the presence of a hose adaptor between each hose section increases the potential for corrosion and the number of potential leakage points in the hose.

It is an object of the present invention to provide an improved seawater suction hose system comprising an improved hose section and a method of assembling a seawater suction hose which obviates or mitigates one or more of the disadvantages referred to above.

SUMMARY OF THE INVENTION

According to a first aspect of the present invention there is provided a seawater suction hose comprising:
  at least one hose section, comprising a plurality of attachment means for attaching an auxiliary hose section thereto, positioned adjacent to an end of the hose section and each including at least one fixing hole for attaching the auxiliary hose section thereto, wherein each of said plurality of attachment means has a protective coating;
  a suction hose head connected to one end of the hose section; and
  a suction strainer connected to the other end of the hose section, said suction strainer further comprising at least a first strainer member, having a first fluid inlet, a first fluid passage and a first fluid outlet, and a second strainer member, having a second fluid inlet, a second fluid passage and a second fluid outlet, first and second strainer members are fluidly separate, and wherein the first strainer member is adapted to be coupled to the other end of the hose section, so as to form at least a two-stage strainer arrangement with the first and second fluid inlets arranged adjoiningly along a longitudinal axis of the hose section, and the first and second fluid outlets forming a combined outlet interface fluidly coupleable to the other end of the hose section.

Advantageously, the suction strainer may further comprise at least a third strainer member, having a third fluid inlet, a third fluid passage and a third fluid outlet, fluidly separate from the first and second strainer member, and wherein the third strainer member is adapted to be coupled to the other end of the hose section, so as to form a three-stage strainer arrangement with the first, second and third fluid inlets arranged adjoiningly along the longitudinal axis of the hose section, and the first, second and third fluid outlets forming a combined outlet interface fluidly coupleable to the other end of the hose section.

Preferably, the first strainer member may be adapted to matingly engage with the second strainer arrangement so as to form a stack along the longitudinal axis.

Advantageously, the second strainer member may be adapted to matingly engage with the third strainer arrangement so as to form a stack along the longitudinal axis.

Advantageously, the attachment means may be mounted within an internal fluid passage of the hose section.

Preferably, the attachment means may be externally mounted to the hose section.

Advantageously, the seawater suction hose may further comprise at least one auxiliary hose section secured to the attachment means of the hose section.

Preferably, the auxiliary hose section may also be secured to the suction strainer and the suction hose head.

Even more preferably, the auxiliary hose section may be a hypochlorite supply hose.

Advantageously, the seawater suction hose may comprise a plurality of hose sections.

Advantageously, the seawater suction hose may comprise a plurality of auxiliary hose sections.

Advantageously, the attachment means may be positioned at the nipple of the hose section.

Preferably, the attachment means may be welded to the hose section.

Even more preferably, the protective coating may be resilient. Even more preferably, the protective coating may be rubber.

Advantageously, the hose section may further comprise connecting means at either end thereof. Preferably, the connecting means may have a protective coating. Even more preferably, the hose section may be flexible.

According to a second aspect of the present invention there is provided a seawater suction hose system comprising:
  at least one caisson; and
  at least one seawater suction hose according to the first aspect of the invention, wherein the caisson is configured to receive and hold the hose in suspension.

Advantageously, the seawater suction hose system may further comprise a caisson interface between the caisson and the seawater suction hose.

Advantageously, the caisson may comprise a suspension apparatus, adapted to selectively secure the hose section during assembly.

Preferably, the suspension apparatus may be removably coupleable to a top end of the caisson when in situ.

Advantageously, the suspension apparatus may comprise a spring operated mechanism adapted to lockingly engage with the hose section.

Advantageously, the suspension apparatus may further comprise a hose section adapter, configured to compensate for a predetermined difference of the external diameters of the hose section.

Preferably, the seawater suction hose system may be configured to be attached to an FPSO vessel.

Even more preferably, the seawater suction hose system may be configured to be formed within the hull of an FPSO vessel.

According to a third aspect of the present invention there is provided a FPSO vessel comprising a seawater suction hose system according to the second aspect of the invention.

According to a fourth aspect of the present invention there is provided a method of assembling a seawater suction hose comprising the steps of:

providing at least two seawater hose sections each having an attachment means for attaching an auxiliary hose section thereto;

attaching an auxiliary hose section to each seawater hose section; connecting the auxiliary hose sections together; and connecting the seawater hose sections together.

Advantageously, the auxiliary hose sections may be hypochlorite supply hoses.

According to a fifth aspect of the present invention there is provided a method of assembling a seawater suction hose comprising the steps of:

providing at least one seawater hose section having an attachment means for attaching an auxiliary hose section thereto;

attaching an auxiliary hose section to the seawater hose section;

connecting a suction hose head to one end of the seawater hose section;

connecting a suction strainer to the other end of the seawater hose section; and connecting the auxiliary hose section to the suction strainer and the suction hose head.

Advantageously, the auxiliary hose section may be a hypochlorite supply hose.

BRIEF DESCRIPTION OF THE DRAWINGS

An embodiment of the present invention will now be described, by way of example only, with reference to the accompanying drawings, in which:

FIG. 1 is a side view of a hose section for a seawater suction hose in accordance with the first aspect of the present invention;

FIG. 2 is a cross-sectional side view of the hose section of FIG. 1;

FIG. 2a is a partial end view of the hose section of FIGS. 1 and 2, detailing the attachment means;

DETAILED DESCRIPTION OF THE PREFERRED EMBODIMENT(S)

Figure 3:
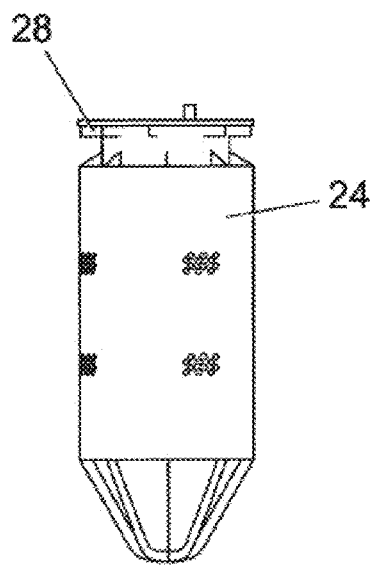
FIG. 3 is a side view of a suction strainer which is used with the hose section of FIG. 1.

FIGS. 1 and 2 illustrate a hose section 10 for a seawater suction hose. The hose section has a cylindrical body 12 forming an internal fluid passage with flanges 14 located at either end thereof (flanges 14 being an example of connecting means).

With reference to FIGS. 2 and 2a, the hose section 10 further comprises an attachment means 18 for attaching a hypochlorite hose section 20 thereto (a hypochlorite hose section being an example of an auxiliary hose section).

The attachment means 18 is welded to the internal surface of the hose section 10 adjacent the hose section nipple (not referenced). The attachment means 18 includes at least one fixing hole 22, which is used to secure the hypochlorite hose section 20 thereto.

The hose section 10 and the hypochlorite hose section 20 are flexible and include tensile reinforcement to reduce weight, increase corrosion resistance and provide excellent fatigue properties. The attachment means 18 and the flanges 14 have a protective coating to prevent corrosion. The protective coating is a resilient material, e.g. rubber.

Figure 4:
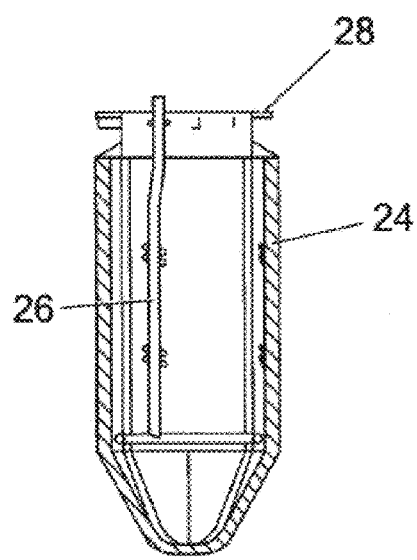
FIG. 4 is a cross-sectional side view of the suction strainer of FIG. 3.

FIGS. 3 and 4 illustrate a suction strainer 24 for use with the hose section 10. The suction strainer 24 strains seawater, which is drawn through the hose section 10. The suction strainer is generally cylindrical in shape and is fitted with a hypochlorite dispersion assembly 26, which is used to disperse hypochlorite around the suction strainer 24. The dispersion of hypochlorite prevents marine growth in the suction hose system and associated pipework of the FPSO. The suction strainer 24 also includes a flange 28, which is used to connect the strainer 24 to the hose section 10.

Figure 5:
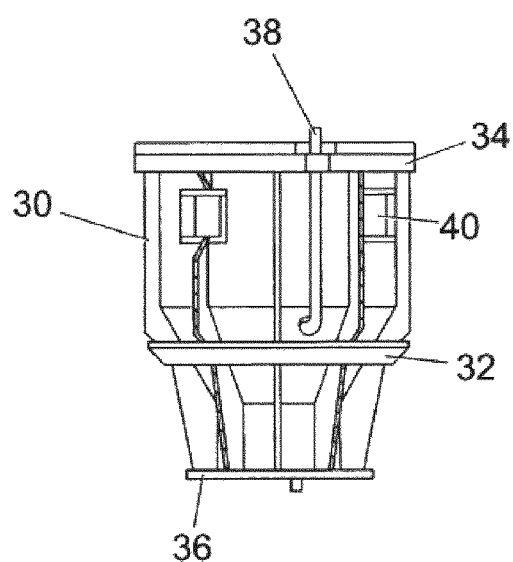
FIG. 5 is a side view of a suction hose head which is used with the hose section of FIG. 1.
Figure 6:
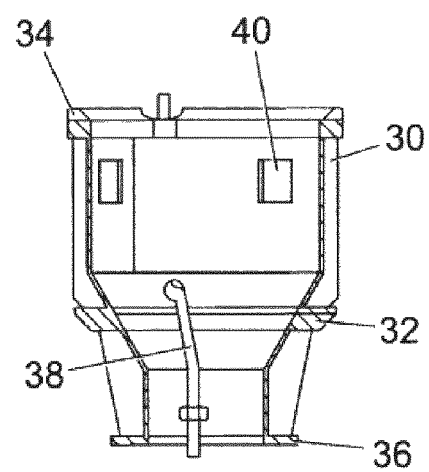
FIG. 6 is a cross-sectional side view of the suction hose head of FIG. 5.

FIGS. 5 and 6 illustrate a suction hose head 30, which is used with the hose section 10. The suction hose head 30 provides the interface between the hose section 10 and a caisson of a seawater suction hose system. The head 30 includes a male conical seat 32 which mates with a female conical seat of a caisson interface, preventing downward movement of the suction hose (see below).

To prevent tilting, the head 30 includes an external upper circumferential bearing ring 34 which mates with a caisson interface internal circumferential bearing ring (see below).

Figure 7:
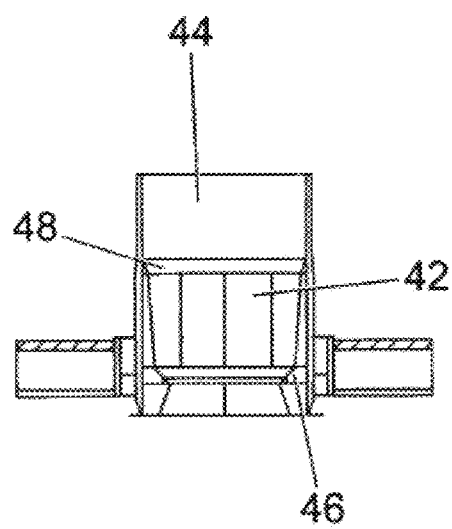
FIG. 7 is a cross-sectional partial side view of a caisson interface installed within a caisson in the hull of an FPSO.

The head 30 also includes a flange 36, which is used to connect a hose section 10 thereto. The head 30 also includes a hypochlorite hose assembly 38. There is also provided engagement means 40 for engaging a deployment/retrieval tool therein (see below). FIG. 7 illustrates a cross-sectional partial side view of a caisson interface 42 installed within a caisson 44 in the hull of an FPSO. The caisson interface 42 includes a female conical seat 46 which mates with the male conical seat 32 of the suction hose head 30 to centralise the head 30. The caisson interface 42 also includes an internal circumferential bearing ring 48 which mates with the external upper circumferential bearing ring 34 of the suction hose head 30.

Figure 8:
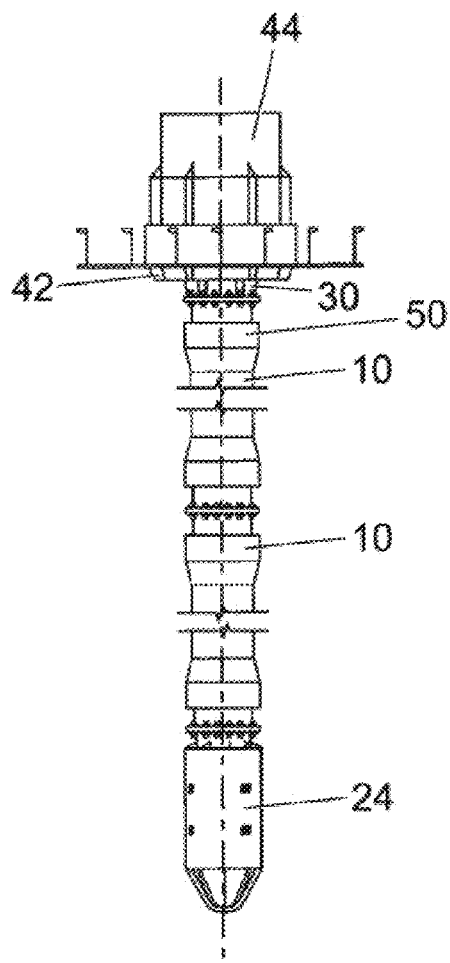
FIG. 8 is a side view of a seawater suction hose system in accordance with the fourth aspect of the present invention.
Figure 9:
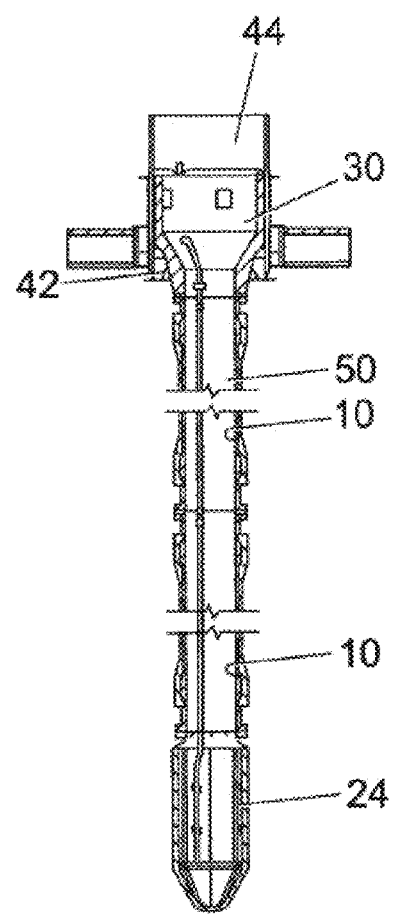
FIG. 9 is a cross-sectional side view of the seawater suction hose system of FIG. 8.

FIGS. 8 and 9 illustrate an assembled seawater hose 50 held in suspension from the caisson interface 42 of the caisson 44 of an FPSO. The hose 50 comprises a plurality of hose sections 10, a suction strainer 24 and a suction hose head 30. The seawater hose 50 and the caisson 44 form a seawater suction hose system.

The assembly of the seawater hose 50 is carried out in a conventional manner, i.e. by suspending each hose section 10 at the top of the caisson 44 whilst each subsequent hose section 10 is attached thereto. The hose sections 10 are bolted together at the flanges 14.

In particular, a hypochlorite hose section 20 is attached to the attachment means 18 of each hose section 10 prior to assembly of the hose sections 10. During assembly, the hypochlorite hose section 20 of a lower hose section 10 is firstly connected to they hypochlorite hose section 20 of an upper hose section 10 prior to connection of the upper and lower hose sections 10. The result is that a continuous hypochlorite hose extends the entire length of the assembled hose 50. In order to make the connection of the hose sections 10 safer, there may be provided a safety collar (not shown), which is connected to a lower hose section 10 whilst the hypochlorite hose sections 20 of the lower and upper hose sections 10 are being connected together. Once the hypochlorite hose sections 20 have been connected, the safety collar is removed and the hose sections 10 bolted together, as described above.

Of course, the suction strainer 24 is connected to the lower free end of the first hose section 10 prior to insertion in the caisson 44. The hypochlorite hose section 20 in the first hose section 10 is connected to the hypochlorite dispersion assembly 26 of the strainer 24 prior to the strainer 24 being bolted to the hose section 10.

The suction hose head 30 is connected to the last upper hose section 10. The hypochlorite hose section 20 in the last hose section 10 is connected to the hypochlorite hose assembly 38 of the head 30 prior to the head being bolted to the hose section 10.

The seawater hose 50 may be lowered in and out of the caisson 44 in a conventional manner by a deployment/retrieval tool (not shown).

The seawater hose 50 is disassembled in a conventional manner, i.e. by lifting the hose 50 toward the top of the caisson 44 and reversing the assembly steps described above.

The hose section 10 therefore obviates or mitigates some disadvantages of previous proposals by proving an attachment means 18 for attaching an auxiliary hose section 20 thereto. Providing a hose section 10 including an attachment means 18 removes the requirement for a hose adaptor to be provided between each hose section of a seawater suction hose to support the hypochlorite supply line. A seawater suction hose 50 comprising a plurality of hose sections 10 has an increased field life, increased reliability and makes the assembly of the hose 50 simpler. By eliminating the hose adaptors:

The number of sub-sea steel components exposed to seawater is significantly reduced, thus reducing cost and minimizing the potential for corrosion.

There is no risk in damaging any protective coating applied to the hose adaptors during installation. As the assembly through the caisson is "blind" the damage to the protective coating is not identified until there is an inspection or failure of the hose.

The level of cathodic protection is reduced.

The number of flanged joints is significantly reduced, thus minimizing potential leakage points.

The internal bore of the hose 50 is smooth, i.e. there are no internal anodes. This reduces the pressure losses through the hose 50.

Modifications and improvements may be made to the above without departing from the scope of the present invention. For example, although the attachment means 18 has been illustrated and described above as being located on an inner surface of the hose section 10, it should be appreciated that the attachment means 18 could be located on an external surface of the hose section 10.

Furthermore, although each hose section 10 has been described above as comprising a single attachment means 18, it should be appreciated that each hose section 10 could comprise two or more attachment means located at various positions in/on the hose section 10. Also, although the seawater suction hose 50 has been illustrated and described above as being installed within a caisson 44 in the hull of an FPSO, it should be appreciated that the seawater hose 50 could be installed in a caisson arranged on the side of an FPSO.

Furthermore, although attachment means 18 has been illustrated and described above as including at least one fixing hole 22 which is used to secure the hypochlorite line thereto, it should be appreciated that the attachment means may comprise any means suitable for attaching the hypochlorite supply line to the hose section 10.

Figure 10:
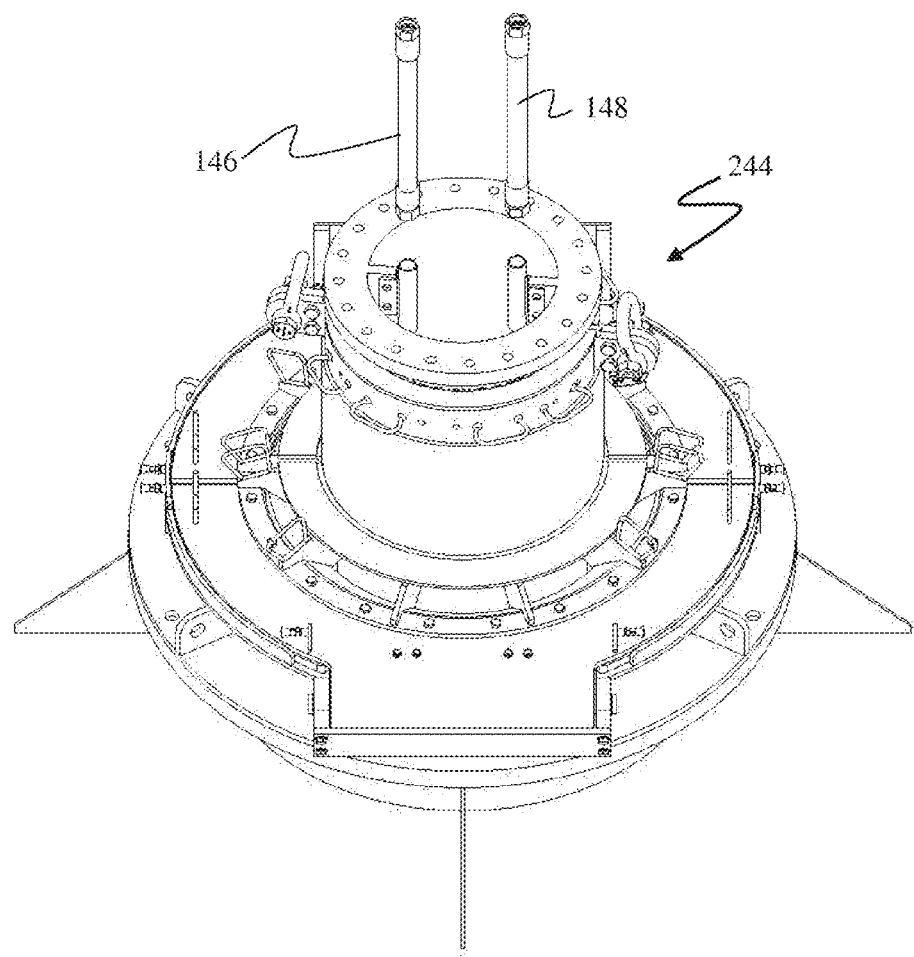
FIG. 10 is a perspective view of a suspension apparatus installed to the caisson top on, for example, an FPSO platform, securing a first conduit during assembly.
Figure 11:
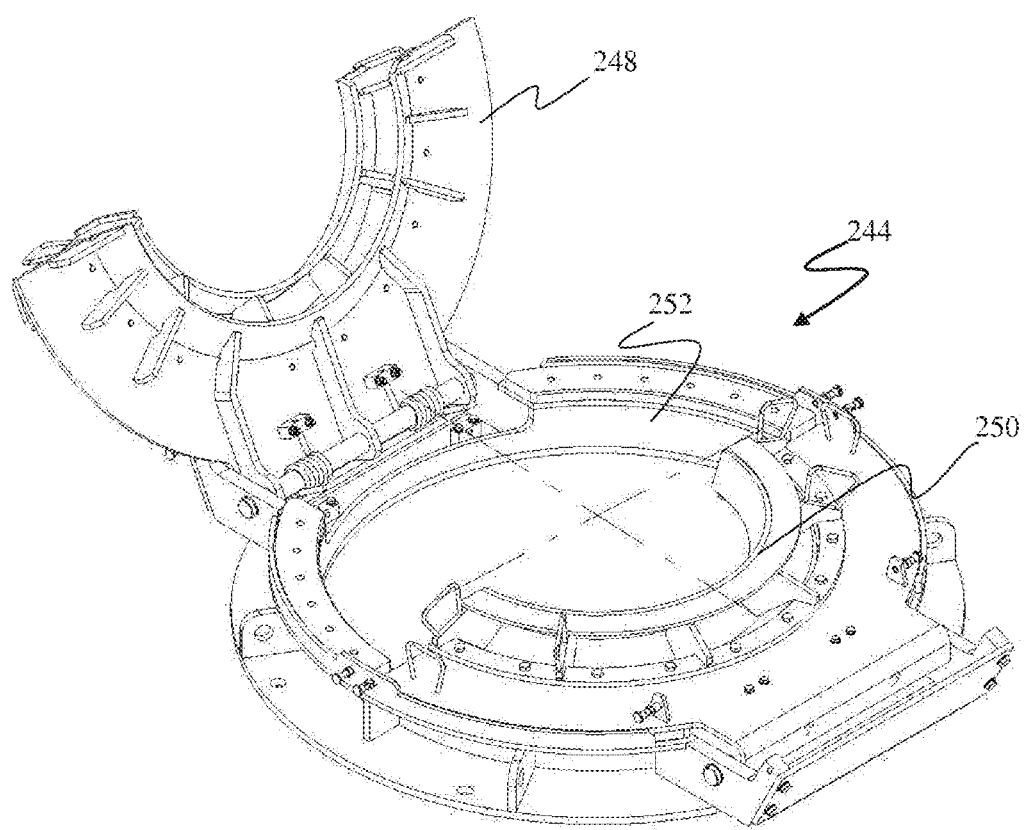
FIG. 11 is a perspective schematic view of the suspension apparatus of FIG. 10 with one spring loaded engagement member opened.

FIGS. 10 and 11 show a more detailed view of a suspension apparatus or tool 244, when in use and mounted to the caisson top (FIG. 10) and as a separate entity in an open, disengaged state (FIG. 11). In particular, the suspension apparatus or tool 244 comprises two spring-loaded engagement members 248, 250 that are operably connected to a mount 252. The mount 252 is adapted to be mounted to the top of a caisson 44. The spring mechanism of the suspension apparatus or tool 244 is adapted to secure the hose section 10 during assembly, i.e. suspending the conduit string while another conduit section is being connected. The suspension apparatus or tool 244 is lighter in weight and much more compact than a conventional hydraulic suspension tool, therefore, allowing for installations in space restricted areas.

In addition, FIG. 10 also shows part of the hose section 10 having two auxiliary fluid lines 146, 148 for providing, for example, hypochlorite fluid that are installed within the internal fluid passage of the hose section 10. The two auxiliary fluid lines 146, 148 are led, for example, to the top of a strainer 24, 118 where they each connect, for example, to a separate dispersion ring (not shown) allowing a more concentrated/higher dosage of hypochlorite to be moved into the internal fluid passage of the section hose string 10. In addition, providing two separate auxiliary fluid lines 146, 148, provides for an increased fluid volume and a degree of redundancy.

Figure 12:
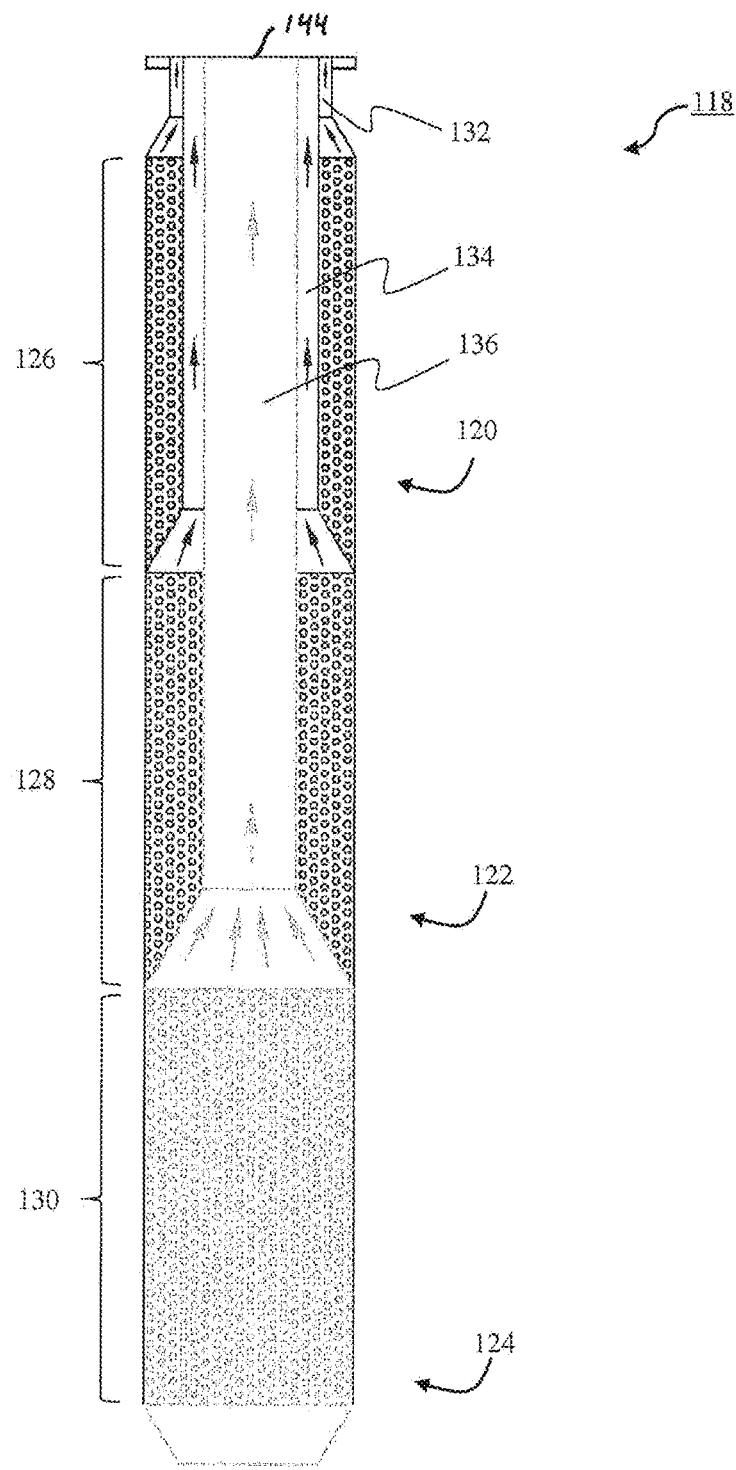
FIG. 12 is a schematic sectional view of a three-stage strainer, each strainer stage having a fluidly separate inlet, fluid passage and outlet, wherein all strainer outlets are combined into a single outlet interface fluidly coupleable to the second conduit.
Figure 13:
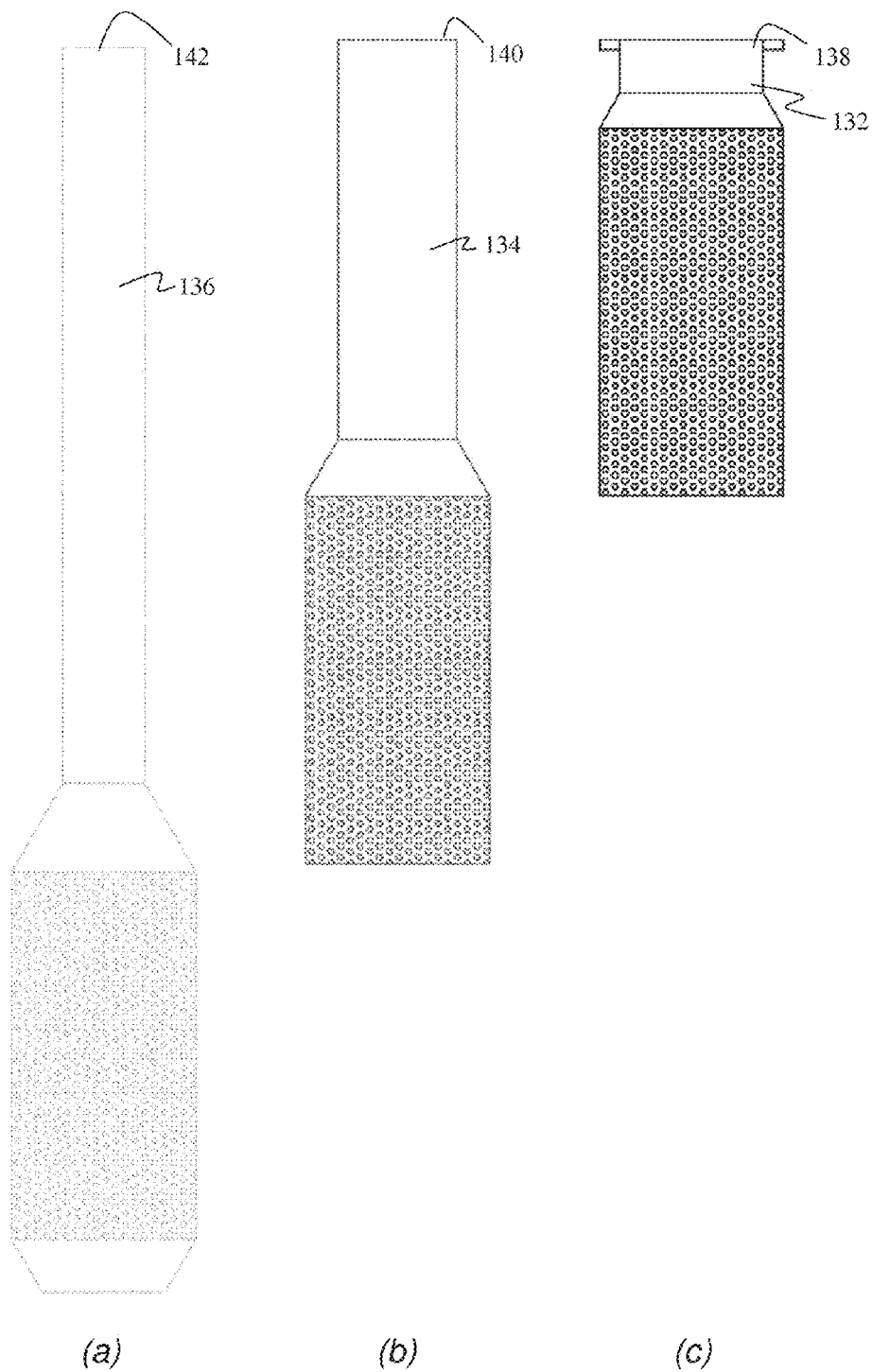
FIG. 13 is a schematic view of the three strainer members when disassembled into (a) stage one, (b) stage two and (c) stage three.

FIGS. 12 and 13 illustrate another example embodiment of a suction strainer 118 that is fluidly coupleable to an end section of the hose section 10. The strainer 118 comprises three fluidly separate strainer members, first strainer member 120, second strainer member 122, and third strainer member 124, that can be assembled into the three-stage strainer 118. Each of the strainer members 120, 122, 124 comprises a fluidly separate inlet section 126, 128, 130, a fluid passage 132, 134, 136, and an outlet 138, 140, 142. The strainer members 120, 122, 124 are formed in such a way that the second strainer member 122 can be matingly stacked onto the third strainer member 124, and the first strainer member 120 can be matingly stacked onto the second strainer member 122. When assembled the three outlets 138, 140 and 142 form a combined interface 144 that is fluidly coupleable to the hose section 10. During use, fluid is moved through all three inlet sections 126, 128, 130 and separately passed through the fluid passages 132, 134 and 136 to exit the combined outlets 138, 140, 142 into the internal fluid passage of the hose section 10.

A seawater suction hose system includes at least one caisson and at least one seawater suction hose. The seawater suction hose includes at least one hose section, including a plurality of attachment means for attaching an auxiliary hose section thereto, positioned adjacent to an end of the hose section and each including at least one fixing hole for attaching the auxiliary hose section thereto. Each of said plurality of attachment means has a protective coating, a suction hose head connected to one end of the hose section, and a suction strainer connected to the other end of the hose section. The suction strainer includes at least a first strainer member, having a first fluid inlet, a first fluid passage and a first fluid outlet, and a second strainer member, having a second fluid inlet, a second fluid passage and a second fluid outlet, first and second strainer members are fluidly separate. The suction strainer is adapted to be coupled to the other end of the hose section, so as to form at least a two-stage strainer arrangement with the first and second fluid inlets arranged adjoiningly along a longitudinal axis of the hose section, and the first and second fluid outlets form a combined outlet interface fluidly coupleable to the other end of the hose section. The first strainer member is adapted to matingly engage with the second strainer arrangement so as to form a stack along the longitudinal axis.

The caisson is configured to receive and hold the hose in suspension. The caisson may include a suspension apparatus, adapted to selectively secure the hose section during assembly. The suspension apparatus may be removably coupleable to a top end of the caisson when in situ. The suspension apparatus may include a spring operated mechanism adapted to lockingly engage with the hose section. The suspension apparatus may include a hose section adapter, configured to compensate for a predetermined difference of the external diameters of the hose section. The seawater suction hose system may be configured to be attached to an FPSO vessel. The seawater suction hose system may be configured to be formed within the hull of an FPSO vessel. A FPSO vessel may include a seawater suction hose system.

A method of assembling a seawater suction hose includes providing at least one seawater hose section having an attachment means for attaching an auxiliary hose section thereto, attaching an auxiliary hose section to the seawater hose section; connecting a suction hose head to one end of the seawater hose section, connecting a suction strainer to the other end of the seawater hose section, and connecting the auxiliary hose section to the suction strainer and the suction hose head. The auxiliary hose section may be a hypochlorite supply hose.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A seawater suction hose comprising:
at least one hose section, comprising an attachment lug for attaching an auxiliary hose section thereto, positioned adjacent to at least one of a first and second end of the hose section and each including at least one fixing hole for attaching the auxiliary hose section thereto, wherein the attachment lug has a protective coating;
a suction hose head connected to the first end of the hose section; and
a suction strainer connected to the second end of the hose section, said suction strainer further comprising at least a first strainer member, having a first fluid inlet, a first fluid passage and a first fluid outlet, and a second strainer member, having a second fluid inlet, a second fluid passage and a second fluid outlet, the first fluid inlet of the first strainer member is fluidly separate from the second fluid inlet of the second strainer member such that the first strainer member and the second strainer member comprise independently operated concentric pipe structures, longitudinally stacked, the first strainer member extending longitudinally a different length from the second strainer member; and
wherein the suction strainer is adapted to be coupled to the second end of the hose section, so as to form at least a two-stage strainer arrangement with the first and second fluid inlets arranged adjoiningly along a longitudinal axis of the hose section, and the first and second fluid outlets forming a combined, fluidly-connected, outlet interface fluidly coupleable to the second end of the hose section, and wherein the first strainer member is adapted to matingly engage with the second strainer member so as to form a stack along the longitudinal axis.

2. The seawater suction hose according to claim 1, wherein the suction strainer further comprises at least a third strainer member, having a third fluid inlet, a third fluid passage and a third fluid outlet, the third fluid inlet of the third strainer member is fluidly separate from the first fluid inlet of the first strainer member and the second fluid inlet of the second strainer member such that the first strainer member, the second strainer member, and the third strainer member comprise independently operated concentric pipe structures, longitudinally stacked, the first strainer member extending longitudinally a different length from the second strainer member and the third strainer member, and wherein the third strainer member is adapted to be coupled to the second end of the hose section, so as to form a three-stage strainer arrangement with the first, second and third fluid inlets arranged adjoiningly along the longitudinal axis of the hose section, and the first, second and third fluid outlets forming a combined, fluidly connected, outlet interface fluidly coupleable to the second end of the hose section.

3. The seawater suction hose according to claim 2, wherein the second strainer member is adapted to matingly engage with the third strainer member so as to form a stack along the longitudinal axis.

4. The seawater suction hose according to claim 1, wherein the attachment lug is mounted within an internal fluid passage of the hose section.

5. The seawater suction hose according to claim 1, wherein the seawater suction hose further comprises at least one auxiliary hose section secured to the attachment lug of the hose section.

6. The seawater suction hose according to claim 1, wherein the attachment lug is positioned at a nipple of the hose section.

7. The seawater suction hose according to claim 1, wherein the attachment lug is welded to the hose section.

8. The seawater suction hose according to claim 1, wherein the protective coating is resilient.

9. The seawater suction hose according to claim 1, wherein the protective coating is rubber.

10. The seawater suction hose according to claim 1, wherein the hose section further comprises connecting means at either end thereof.

11. The seawater suction hose according to claim 10, wherein the connecting means have a protective coating.

12. The seawater suction hose according to claim 1, wherein the hose section is flexible.

13. A method of assembling the seawater suction hose according to claim 1, the method comprising the steps of:
 providing at least one seawater hose section having the attachment lug for attaching the auxiliary hose section thereto;
 attaching the auxiliary hose section to the seawater hose section; connecting the suction hose head to the first end of the seawater hose section;
 connecting the suction strainer to the second end of the seawater hose section; and
 connecting the auxiliary hose section to the suction strainer and the suction hose head.

* * * * *